United States Patent [19]

Hanagan et al.

[11] Patent Number: 4,895,068
[45] Date of Patent: Jan. 23, 1990

[54] GAS GRILL COOLER SHELF

[75] Inventors: Joseph J. Hanagan; Mark R. Rakowski, both of Freeport, Ill.

[73] Assignee: King-Seeley Thermos Company, Freeport, Ill.

[21] Appl. No.: 362,285

[22] Filed: Jun. 6, 1989

Related U.S. Application Data

[63] Continuation of Ser. No. 175,942, Mar. 31, 1988, abandoned.

[51] Int. Cl.⁴ ............................ B28D 1/32; A21B 1/00
[52] U.S. Cl. ...................................... 99/357; 126/9 R
[58] Field of Search ................ 99/357, 484, 374, 376, 99/394, 450, 470, 482; 126/9 R, 41 R, 25 R; 62/331, 457; 220/DIG. 9, DIG. 14

[56] References Cited

U.S. PATENT DOCUMENTS

| | | | |
|---|---|---|---|
| D. 185,035 | 4/1958 | Murdoch | 126/25 R |
| 1,524,961 | 2/1925 | Asche | 62/331 |
| 2,441,994 | 5/1948 | DiPasquale | 99/446 |
| 2,511,648 | 6/1950 | Milholland | 62/457 |
| 2,606,586 | 8/1952 | Hill | 220/DIG. 14 |
| 2,667,392 | 1/1954 | Sexton | 126/25 R |
| 2,711,766 | 6/1955 | Archer et al. | 220/DIG. 14 |
| 3,144,167 | 8/1964 | Schultz | 220/DIG. 14 |
| 3,380,444 | 4/1968 | Stalker | 126/25 R |
| 3,922,879 | 12/1975 | Arnold | 62/457 |
| 4,688,541 | 8/1987 | Stephan et al. | 126/25 R |

Primary Examiner—Robert W. Jenkins
Attorney, Agent, or Firm—Harness, Dickey & Pierce

[57] ABSTRACT

The tubular frame of the grill cart forms a laterally extending shelf with opening into which an insulated container removably nests. A heat shield of folded metal with slotted apertures to inhibit heat transfer by conduction protects the container from the intense heat developed by the grill by deflecting radiated thermal energy and by inhibiting air current convection heat transfer. The insulated container may hold either refrigerated or heated items and features opposing carrying handles which rest upon the frame to support the container with its lid in a generally horizontal plane. The lid in this position may be used as a countertop work space while tending the grill. The lid may also be flipped over to expose a contoured surface with recess compartments for holding beverage containers, plates and trays.

13 Claims, 3 Drawing Sheets

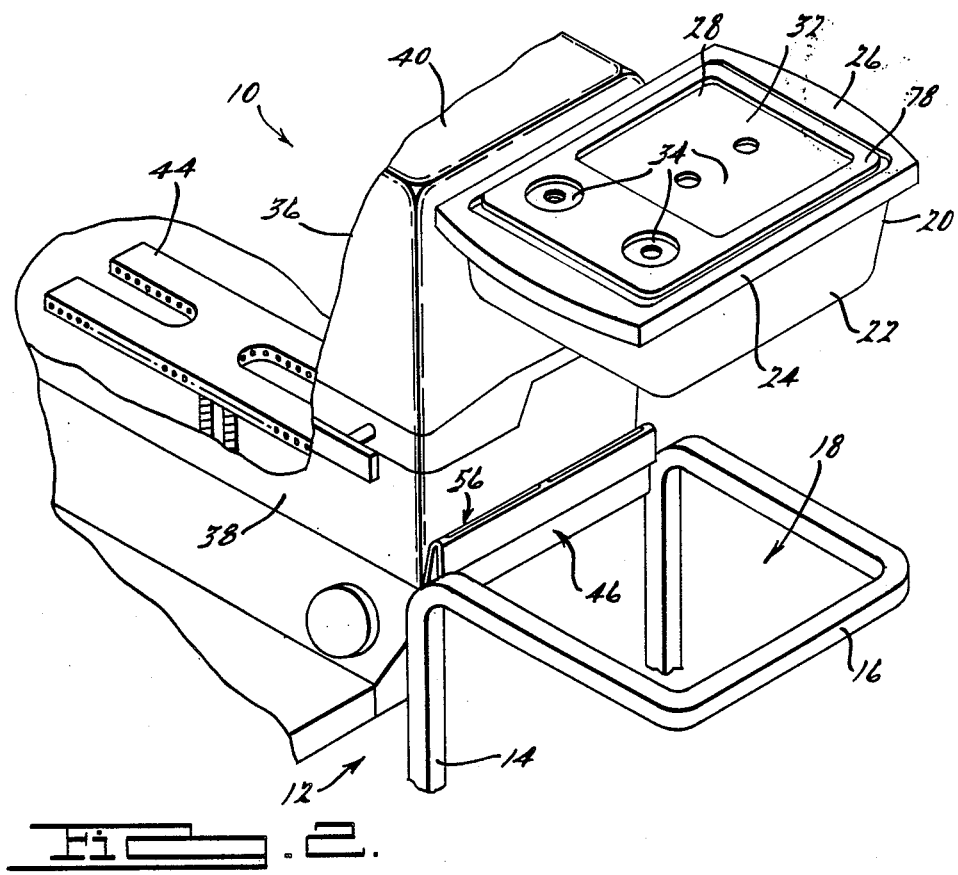
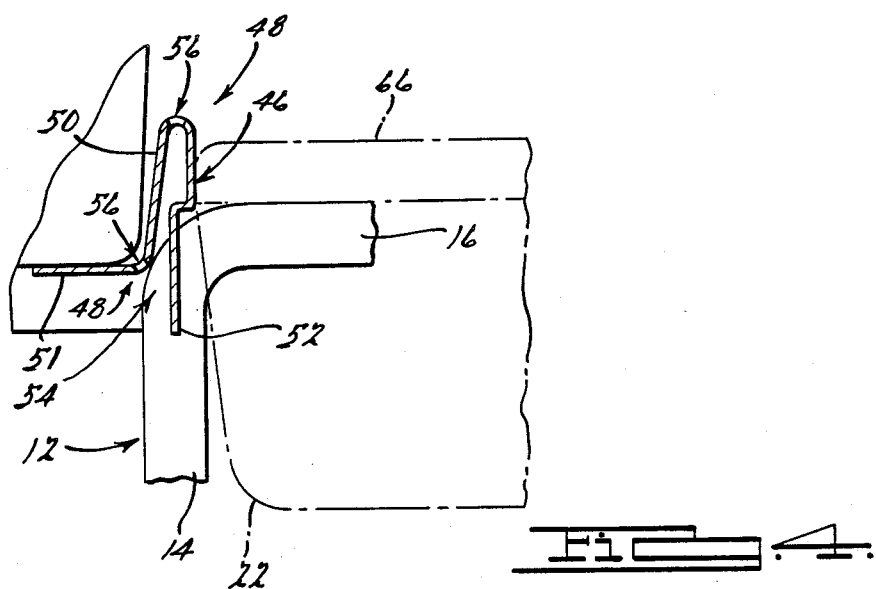

GAS GRILL COOLER SHELF

This is a continuation of application Ser. No. 175,942, filed Mar. 31, 1988, entitled "Gas Grill Cooler Shelf."

BACKGROUND AND SUMMARY OF THE INVENTION

The invention relates generally to barbecue grills and more particularly to a barbecue grill having a removable insulated container with lid forming a horizontal shelf adjacent the grill. The insulated container is suitable for use as a cooler and is protected by a heat shield supported by the leg framework structure.

In the hot summer months barbecuing meals and eating out of doors is a popular way to entertain, to enjoy nature and to avoid the heat of a hot kitchen. Barbecue grills for this purpose can take a wide variety of shapes, sizes and configurations, ranging from small charcoal fired hibachi grills to multiple burner gas or propane fired grills mounted upon carts having shelves for convenience. At the typical patio cookout or picnic one often also finds the ubiquitous cooler for containing cold beverages, ice and other condiments and foods requiring refrigeration.

While a suitable grill, a cooler, perhaps a few lawn chairs and the friends or family can offer the makings of a good barbecue or picnic, there is still considerable room for improvement in the grill and cooler art. The present invention offers such an improvement by providing the convenience of a grill having a removable insulated container or cooler which integrally nests in side extensions of the cart. The container is preferably a double-walled and insulated plastic container having a removable and invertible cover which defines a substantially horizontal shelf adjacent the grill for the convenient placement of cooking utensils and the like while cooking. The container or cooler is removably carried by or attached to the grill cart in close proximity to the grill itself. A heat shield protects the container or cooler from the intense heat of the grill heat source. The open top of the container or cooler is formed with laterally extending handles which rest atop the side extending tubular frame of the cart to hold the container in place, allowing the body of the container to extend through and beneath the side extending frame.

The heat shield comprises a rebent or folded sheet metal structure defining two panels interposed between the grill housing and the insulated container. The folded shield defines an airspace between the panels and is further formed with a plurality of elongated slotted openings at the fold. The slotted openings minimize heat transfer by conduction from one panel to the other.

Thus the invention provides the convenience and utility of both a grill and an insulated container or cooler in a single package, with the lid of the insulated container serving as a horizontal shelf adjacent the grill. The mechanism for holding the insulated container in place also serves as handles for carrying the insulated container when it is separated from the grill unit. For a more complete understanding of the invention, its objects and advantages, reference may be had to the following specification and to the accompanying drawings.

BRIEF DESCRIPTION OF THE DRAWINGS

FIG. 2 is a fragmentary perspective view illustrating the insulated container lifted away from the nested position to better reveal the laterally extending tubular frame and heat shield and also illustrating the container top in its inverted position;

FIG. 4 is a cross-sectional view taken substantially along the line 4—4 of FIG. 3 illustrating further details of the heat shield;

DESCRIPTION OF THE PREFERRED EMBODIMENT

Figure 1:
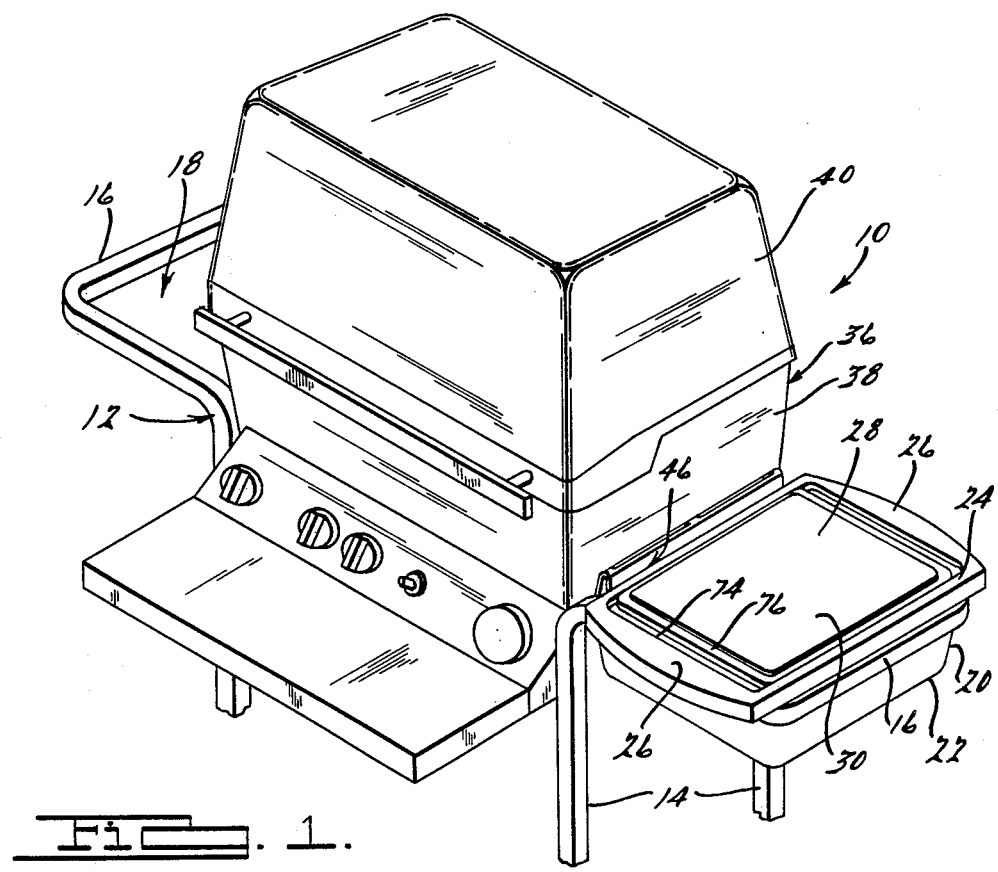
FIG. 1 is a perspective view of the invention illustrating the grill and insulated container in the assembled or nested configuration and illustrating the container top which presents a substantially horizontal countertop surface adjacent the grill.

Referring to FIG. 1, the grill and container apparatus is illustrated generally at 10. The apparatus includes a frame 12, preferably constructed of hollow tubular metal stock of rectangular cross section. Frame 12 may be in the form of a cart having wheels or casters (not shown) and it may include one or more storage racks for holding fuel cannisters and may be outfitted with front, rear and side panels to define an enclosed lower cabinet and to give the apparatus a more decorative appearance. To simplify the understanding of the invention, the lower shelf, fuel cannister and panels have not been illustrated in the Figures.

Frame 12 defines two pairs of generally vertically arranged legs 14, each pair being connected at the top to form an outwardly and laterally extending support portion 16. Support portions 16 may serve as handles when transporting the apparatus 10 and also define a generally rectangular opening 18 into which the insulated container 20 nests.

More specifically, container 20 has a lower portion 22 which extends through opening 18 and depends generally below support portion 16. Container 20 further has an outwardly flared open end 24. The underside of flared open end 24 rests upon support portion 16. Preferably the flared open end includes a pair of outwardly extending and opposing handle portions 26. Container 20 also includes a lid 28. Lid 28 is reversible in that it has a substantially flat first surface 30, which serves as a convenient countertop. As seen in FIG. 2, the flip side of lid 28 has a molded contoured surface 32 having a plurality of recessed compartments 34 of various shapes for holding beverage containers, plates, trays and the like. FIG. 2 also illustrates container 20 lifted away from nesting engagement in rectangular opening 18. As illustrated, lower portion 22 is of a size and shape to generally conform to the size and shape of opening 18.

The grill and container apparatus further comprises grill unit 36 which includes a lower grill housing 38 and an upper hood or cover 40. Disposed within the lower housing is a heat source such as gas burner 44 (FIG. 2). While a gas burner of the type for burning bottled gas is presently preferred, the invention may be practiced using grills employing other heat sources, including natural gas fed burners, liquid fossil fuels and charcoal or wood, to name a few.

To protect container 20 from the intense heat given off by burner 44 during operation, a heat shield 46 is provided in the location shown in FIGS. 1 and 2 generally between lower grill housing 38 and container 20 when nested in rectangular opening 18. Although only one container has been illustrated in FIGS. 1 and 2 for placement within opening 18 on the right-hand side of apparatus 10, it will be understood that a similar container may be placed in the opening 18 on the left-hand side of the apparatus as well. Preferably both containers are of the same size and shape so that they may be interchangeably placed in either of the openings 18.

Figure 3:
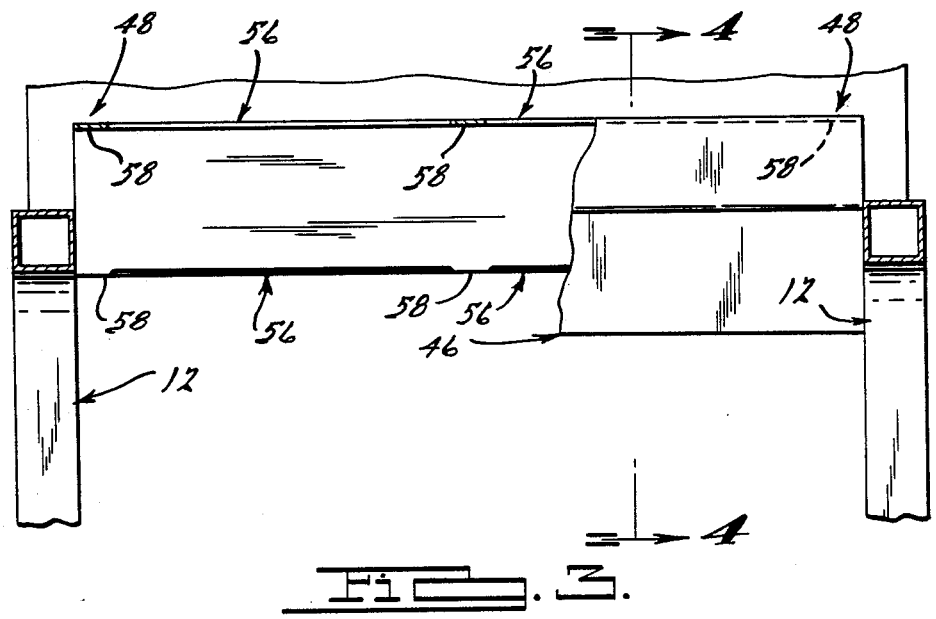
FIG. 3 is a cross-sectional view with cross section taken generally vertically through the laterally extending tubular frame to reveal the heat shield in greater detail.

FIGS. 3 and 4 show heat shield 46 in greater detail. Preferably heat shield 46 comprises a rebent or folded rectangular sheet metal member folded as at 48 to define a generally rectangular grill facing panel 50 and a complementary container facing panel 52 and a mounting panel 51. Panels 50 and 52 define an airspace 54 therebetween and the shield is formed with a plurality of elongated slotted openings 56 along folds 48. Thus except for a few sheet metal bridge portions 58 which hold panels 50, 51 and 52 together, the panels are otherwise detached from one another, thereby minimizing heat transfer from panel 50 to panel 51 and from panel 51 to panel 52 by thermal conduction. Thus the slotted openings 56 provide a means for minimizing thermal conduction between panels 50 and 52. While the slotted opening is presently preferred, other alternative means for minimizing thermal conduction are also possible, including forming the folded portion or bridge portion from a material of low thermal conductivity such as plastic, wood or the like. In addition, airspace 54 may be filled with a thermally insulating material such as fiberglass, or the like. Heat shield 46 operates as a barrier, reducing heat transfer by air current convection and also reduce heat transfer by deflecting radiant energy away from container 20.

Figure 5:
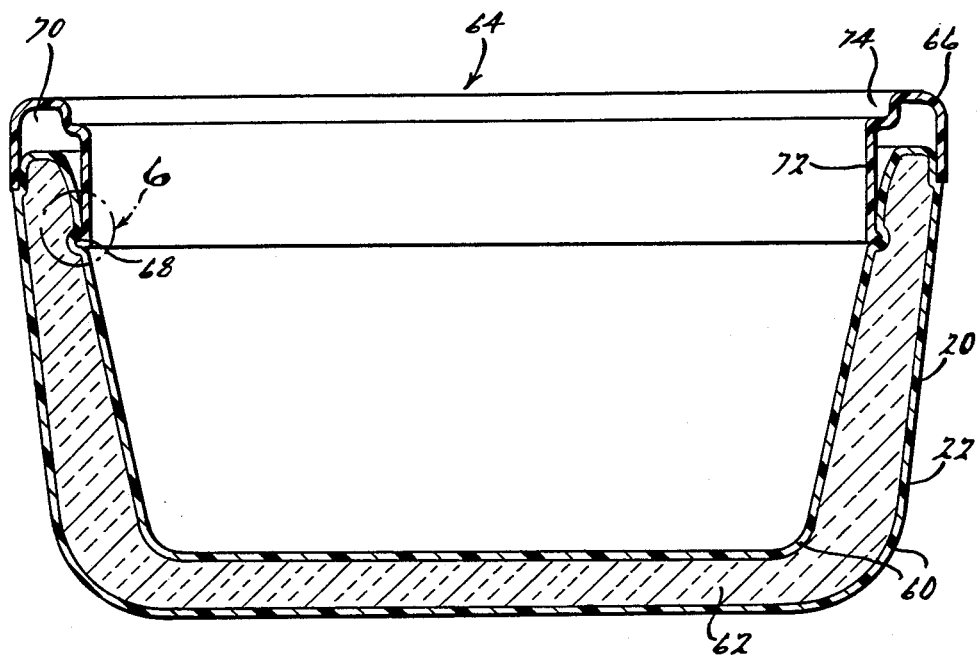
FIG. 5 is a cross-sectional view of the insulated container.
Figure 6:
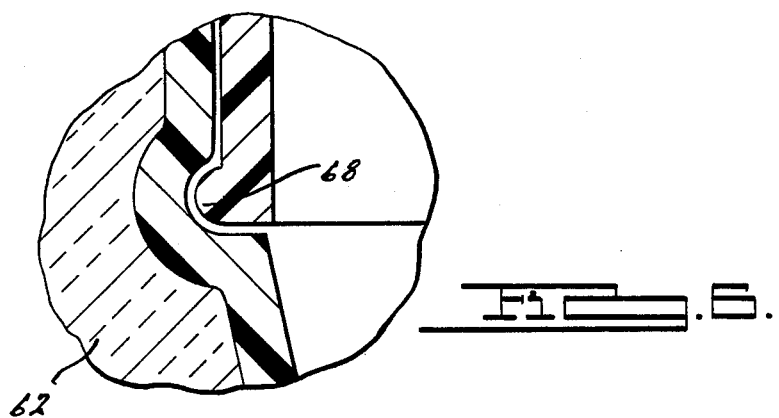
FIG. 6 is a detailed cross-sectional view showing the manner in which the container trim member snap fits in place.

Referring now to FIG. 5, the presently preferred container 20 comprises a double-walled lower portion 22 in which an outer double wall-forming shell 60 encloses an insulating material 62. Lower portion 22 is open at the top as at 64 and includes a plastic trim member 66 as shown in FIG. 6, trim member 66 snap fits onto shell 60 as at 68. The trim member defines an airspace 70 which serves as further insulation about the open end. The trim member defines a smooth generally vertically arranged sidewall 72 into which the lid (not shown) nests. Trim member 66 further defines a radially extending channel 74. When lid 28 is positioned in place, as shown in FIGS. 1 and 2, the channel 74 serves to permit the user to grasp and remove the lid by grasping rail 76 (on the flat surface side) or by grasping raised platform 78 (on contoured side). The flat vertical sidewalls 72 provide a close tolerance, tight fit with lid 28, thereby improving the insulating qualities of the container.

As illustrated in FIG. 4, trim member 66 is positioned so that only it and not the lower portion 22 contacts the heat shield. Contact is generally along the upper portion of the panel 52. The trim member is preferably made of a heat resistant plastic material such as glass-filled polypropylene.

The container is preferably of a plastic material such as vinyl, polyethylene or the like, but it may be made of other materials as well. The container may be used to store either refrigerated items which are desired to be kept cold or it may store heated items, such as food prepared on the grill prior to serving. Container 20 may be placed directly in a refrigerator or freezer prior to use and then placed in nesting relationship within opening 18 for use.

While the invention has been described in connection with the presently preferred embodiment, it will be understood that the invention is capable of certain modification and change without departing from the spirit of the invention as set forth in the appended claims.

What is claimed is:

1. A grill and storage apparatus comprising:
   a grill having a containment means for containing at least one heat source;
   at least one insulated container;
   an external frame for receiving and supporting said grill, said frame having an outwardly and laterally extending support portion which defines an opening, said support portion further being substantially thermally isolated from said containment means and operable to support said insulated container about a portion of its periphery;
   said insulated container being removably supported by said support and nestably engaging said opening;
   a heat shield means comprising a unitary rebent sheet member disposed in spaced relation between said containment means and said insulated container for protecting said insulated container from heat developed by said heat source.

2. The apparatus of claim 1 wherein said one heat source includes a gas burner.

3. The apparatus of claim 1 wherein said insulated container comprises a double-walled container.

4. The apparatus of claim 1 wherein said insulated container comprises a plastic material.

5. The apparatus of claim 1 wherein said insulated container comprises double walls having an insulating material between said walls.

6. The apparatus of claim 1 wherein said one insulated container includes a top-mounted lid which defines a substantially horizontal shelf.

7. The apparatus of claim 1 wherein said rebent sheet member defines a first panel adjacent to and facing said containment means and a second panel adjacent to and facing said insulated container.

8. The apparatus of claim 7 wherein said rebent sheet member includes an elongated slotted opening between said first and second panels for reducing thermal conduction between said panels through said sheet member.

9. A grill and storage apparatus comprising:
   a grill having a containment means for containing at least one heat source;
   at least one insulated container;
   an external frame for receiving and supporting said grill, said frame having an outwardly and laterally extending support portion which defines an opening, said support portion further being substantially thermally isolated from said containment means and operable to support said insulated container about a portion of its periphery;
   said insulated container being removably supported by said support portion and nestably engaging said opening;
   a heat shield means comprising a unitary rebent sheet member disposed in spaced relation between said containment means and said insulated container for protecting said insulated container from heat developed by said heat source, said rebent sheet member defines a first panel adjacent to and facing said containment means and a second panel adjacent to and facing said insulated container, and where said first panel and said second panel further form a continuous, single heat insulating member.

10. A grill and storage apparatus comprising:

a grill having a containment means for containing at least one heat source;

at least one insulated container;

an external frame for receiving and supporting said grill, said frame having an outwardly and laterally extending support portion which defines an opening, said support portion further being substantially thermally isolated from said containment means;

said insulated container being removably supported by said support portion and nestably engaging said opening;

a heat shield means comprising a rebent sheet member disposed in spaced relation between said containment means and said insulated container for protecting said insulated container from heat developed by said heat source, said rebent sheet member having an overall inverted U-shape in cross-section with a first leg panel adjacent to and facing said containment means and a second leg panel adjacent to and facing said insulated container, and where said first and second leg panels further form a continuous, single heat insulating member.

11. The grill and storage apparatus according to claim 10 wherein said rebent sheet member including a flange panel extending from said first leg panel for mounting said rebent sheet member.

12. The grill and storage apparatus according to claim 11 wherein said rebent member includes one or more slots at the web of said inverted U-shape between said first and second leg panels and one or more slots at the junction of said flange panel and said first panel, said slots for minimizing thermal conduction.

13. The grill and storage apparatus according to claim 10 wherein said rebent sheet member including slot means for minimizing thermal conduction between said panels.

* * * * *

UNITED STATES PATENT AND TRADEMARK OFFICE
CERTIFICATE OF CORRECTION

PATENT NO. : 4,895,068

DATED : January 23, 1990

INVENTOR(S) : Joseph J. Hanagan et al.

It is certified that error appears in the above-identified patent and that said Letters Patent is hereby corrected as shown below:

Column 4, line 22, Claim 1, after "support" insert -- portion --.

Signed and Sealed this

Second Day of April, 1991

Attest:

HARRY F. MANBECK, JR.

*Attesting Officer*  *Commissioner of Patents and Trademarks*